C. A. PRINDLE.
CHAIN.
APPLICATION FILED JUNE 12, 1911.

1,058,260. Patented Apr. 8, 1913.

Witnesses:
Inventor.
Charles A. Prindle
By Hill & Hill
Attys.

UNITED STATES PATENT OFFICE.

CHARLES A. PRINDLE, OF CHICAGO, ILLINOIS.

CHAIN.

1,058,260. Specification of Letters Patent. Patented Apr. 8, 1913.

Application filed June 12, 1911. Serial No. 632,587.

*To all whom it may concern:*

Be it known that I, CHARLES A. PRINDLE, a citizen of the United States, residing at Chicago, in the county of Cook and State of Illinois, have invented certain new and useful Improvements in Chains, of which the following is a description.

My invention belongs to that general class of devices known as chains, and relates particularly to chains for transmitting power and suitable wheels therefor arranged to coöperate therewith and transmit power or motion to or from the chain.

The invention has among its objects the production of a chain and wheels therefor that are simple, convenient, durable, efficient and satisfactory, and that may be used wherever found applicable.

To this end my invention consists in the novel construction, arrangement and combination of parts herein shown and described, and more particularly pointed out in the claims.

Figure 1:
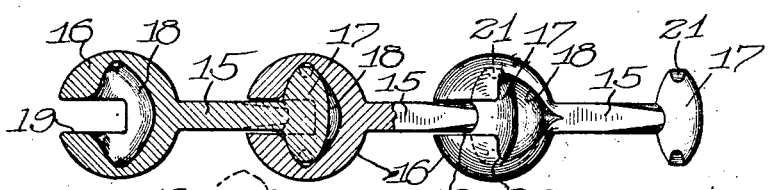
Figure 2:
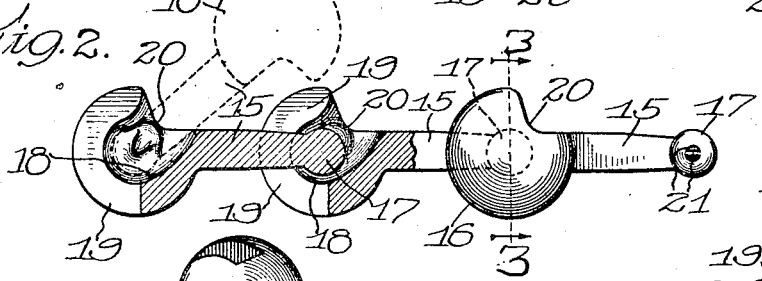
Figure 3:
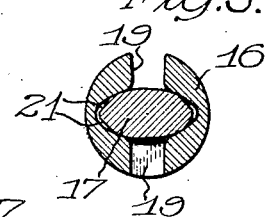
Figure 4:
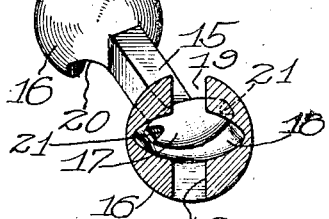
Figure 5:
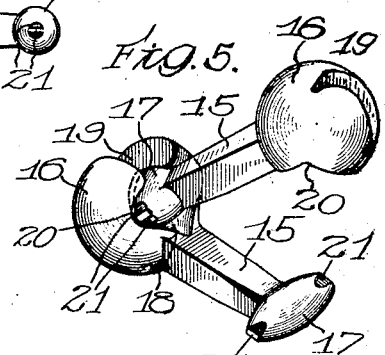

In the drawings, wherein like reference characters indicate like or corresponding parts: Figure 1 is a plan view, parts being shown in section, of several assembled links illustrating one form of the invention; Fig. 2 is a side elevation of the same, parts being shown in section; Fig. 3 is a section taken on line 3—3 of Fig. 2; Fig. 4 is a perspective view of one link and a cross sectional view of another, illustrating the manner of assembling the links shown in Figs. 1, 2 and 3; and Fig. 5 is a perspective view of two similar links, also illustrating the manner of assembling the same.

In the embodiment of the invention illustrated in the drawings, the chain comprises a plurality of links of such a construction that they can be secured together without rivets or the like, and may be readily joined together or detached.

Referring to the drawings, each link comprises a shank 15 provided with a cup-shaped or recessed spherical end 16, the same being recessed as at 18 and preferably slotted as at 19 (see Fig. 2). The link is also preferably cut down at this end as at 20. The opposite end of the link is formed substantially as at 17 and arranged to be positioned in the recess 18 and engage the walls thereof. The ends are preferably beveled as at 21 to facilitate the assembling of the links, the recess being slightly grooved, as most clearly shown in Fig. 4. When the links are assembled the end 17 of one link engages the end 16 of an adjacent link in the pocket or recess 18 thereof, and the end 17 of that link similarly engages the next link, etc. In assembling the links, one link, for example, is held substantially as indicated by the lower link in Fig. 5, and the link to be joined thereto positioned substantially as shown or indicated by the upper link, the same being turned back as indicated by the dotted lines in Fig. 2 and slightly to one side as shown in Fig. 4. The end 17 of the upper link is then forced into the pocket 18 by bringing the shank of the link substantially parallel or over the shank 15 of the lower link. The upper link may then be turned from the position indicated by the dotted lines in Fig. 2, down into the position of the links shown in Fig. 2. It will be noted that the links may be turned about for a considerable distance, as a matter of fact almost 180 degrees, without danger of the links separating, so that the chain may pass over or drive or be driven by wheels of comparatively small diameters. The links are easily detached by reversing the steps described for assembling the chain. It will be noted that the chain is formed with balls at the point of pivotal connection of the links.

It is of course understood that the links may be of any desired proportions and of any suitable material, the proportions and material depending upon the use for which the chain is intended.

With the chain illustrated in the drawings there are no sharp corners to catch or pick up foreign objects. The uses for the chains are too numerous to mention, but it may be stated that they are particularly applicable for use on agricultural machinery, vehicles, conveyers and hoisting machinery. It will be noted that owing to there being no sharp corners, the chain is particularly convenient for use on block and tackle.

Having thus described my invention, it is obvious that various immaterial modifications may be made in the same without departing from the spirit of my invention, hence I do not wish to be understood as limiting myself to the exact form, construction or combination of parts herein shown and described, or uses mentioned.

What I claim as new and desire to secure by Letters Patent is:—

1. In a chain, a link provided at one end with an enlargement having a socket therein, said enlargement being provided with a slot in the wall thereof communicating with the socket therein and in alinement with the shank of the link, and with a transverse opening communicating with said slot and said socket, a second link comprising a shank provided at one end thereof with a head loosely fitting within the socket in the enlargement of said first mentioned link, said head and socket being fashioned to permit disengagement of the links upon a relative movement thereof only after one of the links has been first moved to a position overlying the other of said links and then shifted laterally with reference to said links.

2. In a chain, a link comprising a shank provided at one end with an enlargement having a socket therein, said enlargement being provided adjacent the shank of the link with an opening in the wall thereof communicating with said socket and of slightly less width than the socket, and a second link comprising a shank provided at one end with a transversely disposed head pivotally supported in the socket in the enlarged head of said first mentioned link, said head being of a length greater than the width of the opening communicating with the socket and of a thickness to pass through said opening when the head is tilted on one end thereof in said socket.

3. In a chain, a link comprising a shank provided at one end with an enlargement having a socket therein, the wall of said enlargement being provided with a slot communicating with the socket therein in alinement with the shank of the link, and with an opening adjacent the shank of the link in communication with said slot, and with said socket, said opening being of slightly less width than the socket, and a second link comprising a shank provided at one end with a transversely disposed elongated head pivotally supported in the socket in the enlarged end of said first mentioned link, said head being of a length greater than the width of the opening communicating with the socket and of a thickness to pass through said opening when the head is tilted on one end thereof in said socket.

4. In a chain, a link comprising a shank provided at one end with an enlargement having a transversely disposed socket therein, the ends of which are substantially conical in shape, the wall of said enlargement being provided with an opening therein of slightly less width than the socket and in communication therewith, a second link comprising a shank provided with a transversely disposed elongated head provided with substantially conical shaped end portions pivotally supported in the socket in the enlarged end of said first mentioned link, said elongated head being of a length greater than the width of the opening communicating with the socket and of a thickness to pass through said opening when the head is tilted on one end thereof in said socket.

5. In a chain, a link comprising a shank provided at one end with an enlargement having a transversely disposed socket therein, the ends of said socket being substantially conical in shape, the wall of said enlargement being provided with a slot therein in alinement with the shank of the link and communicating with said socket and with an opening therein in communication with said slot and with said socket, said opening being of slightly less width than the width of the socket, a second link comprising a shank provided with a transversely disposed head pivotally supported in the socket in the enlarged end of said first mentioned link, said elongated head being of a length greater than the width of the opening communicating with the socket and of a thickness to pass through said opening when the head is tilted on one end thereof in said socket.

6. In a chain, a link comprising a shank provided at one end with an enlargement having a transversely disposed socket therein, the ends of said socket being substantially conical in shape, the wall of said enlargement being provided with a slot therein in alinement with the link and communicating with said socket, and with a transversely disposed opening therein in communication with said slot and with said socket, said transversely disposed opening being of slightly less width than the width of the socket, a second link comprising a shank provided with a transversely disposed elongated head pivotally supported in the socket in the enlarged end of said first mentioned link, said head being of a length greater than the width of the transversely disposed opening communicating with the socket and of a thickness to pass through said opening when the head is tilted on one end thereof in said socket, said head and socket being provided with coöperating portions preventing such tilting movement of the head except when said second link is moved to a position to overlie said first link.

In testimony whereof, I have hereunto signed my name in the presence of two subscribing witnesses.

CHARLES A. PRINDLE.

Witnesses:
 ROY W. HILL,
 CHARLES I. COBB.